US009049628B2

(12) United States Patent
Swaminathan et al.

(10) Patent No.: US 9,049,628 B2
(45) Date of Patent: Jun. 2, 2015

(54) METHOD AND APPARATUS FOR SELECTIVE BETTER SYSTEM RESELECTION FOR WIRELESS DEVICES CAPABLE OF CELL RESELECTION

(71) Applicant: QUALCOMM Incorporated, San Diego, CA (US)

(72) Inventors: Arvind Swaminathan, San Diego, CA (US); Cat C. Le, San Diego, CA (US); Nam Soo Park, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 152 days.

(21) Appl. No.: 13/772,038

(22) Filed: Feb. 20, 2013

(65) Prior Publication Data

US 2014/0071940 A1    Mar. 13, 2014

Related U.S. Application Data

(60) Provisional application No. 61/700,759, filed on Sep. 13, 2012.

(51) Int. Cl.
*H04W 4/00* (2009.01)
*H04W 36/00* (2009.01)
*H04W 48/18* (2009.01)
*H04W 88/06* (2009.01)

(52) U.S. Cl.
CPC .......... *H04W 36/0061* (2013.01); *H04W 48/18* (2013.01); *H04W 88/06* (2013.01)

(58) Field of Classification Search
CPC ..... H04W 80/04; H04W 36/18; H04W 36/30; H04W 36/12; H04W 36/32; H04W 64/00; H04W 36/04

USPC ................................... 370/331; 455/436–445
See application file for complete search history.

(56) References Cited

U.S. PATENT DOCUMENTS

| | | |
|---|---|---|
| 2008/0200169 A1 | 8/2008 | Gao |
| 2010/0267383 A1 | 10/2010 | Konstantinou et al. |
| 2011/0014913 A1 | 1/2011 | Yoon et al. |
| 2011/0201338 A1* | 8/2011 | Zou ............................. 455/436 |
| 2011/0207473 A1* | 8/2011 | Swaminathan et al. ... 455/456.1 |
| 2012/0083276 A1 | 4/2012 | Roberts et al. |
| 2012/0087362 A1 | 4/2012 | Islam et al. |
| 2013/0078996 A1* | 3/2013 | Doshi et al. ................ 455/426.1 |

FOREIGN PATENT DOCUMENTS

EP    2362695 A1    8/2011

OTHER PUBLICATIONS

International Search Report and Written Opinion—PCT/US2013/059770—ISA/EPO—Jul. 7, 2014.

* cited by examiner

*Primary Examiner* — Ronald B Abelson

(74) *Attorney, Agent, or Firm* — James Hunt Yancey, Jr.; Stanton Braden

(57) ABSTRACT

Aspects of the present disclosure are directed to methods and apparatus for selective better system reselection for wireless devices capable of cell reselection. An apparatus for wireless communication is configured to receive a message from a current system, the message including a neighbor list having one or more neighbor systems. The apparatus compares the neighbor list to a local preferred systems list, and determine an existence of a preferred neighbor system in the local preferred systems list. The preferred neighbor system has higher priority than that of the neighbor systems in the neighbor list. The apparatus determines whether to perform Better System Reselect (BSR) for the preferred neighbor system instead of cell reselection based on the determination.

36 Claims, 8 Drawing Sheets

| Fields | Bit field |
|---|---|
| ServingNetworkPLMNIncl | 0 or 1 |
| NumServingPLMNIDs | 0 or 3 |

If NumServingPLMNIDs field is included, the NumServingPLMNIDs+1 occurrences of the following record; Otherwise, 0 occurrences of the following record.

| S_PLMNID | 24 |
|---|---|

| LTE Coverage | No LTE Coverage |
|---|---|
| C2K cells completely contained in this area advertise LTE Neighbor list message with<br><br>1. Serving PLMN-IDs contains Operator's LTE PLMN-ID AND<br>2. LTE neighbor frequencies | C2K cells that lie in this area advertise LTE neighbor list message with<br><br>1. Operator's LTE PLMN-ID<br>2. No LTE frequencies |
| Legacy UE<br><br>Will execute BSR for LTE based on MSPL | Legacy UE<br><br>Will execute BSR for LTE based on MSPL |
| New UE<br><br>Will not execute<br>1. BSR for operator's LTE network,<br>But will execute<br>1. Reselection evaluation for LTE neighbors | New UE<br><br>Will neither execute BSR or Reselection evaluation (since there are no neighbors) |

FIG. 7

METHOD AND APPARATUS FOR SELECTIVE BETTER SYSTEM RESELECTION FOR WIRELESS DEVICES CAPABLE OF CELL RESELECTION

CROSS-REFERENCE TO RELATED APPLICATIONS

This application claims priority to and the benefit of provisional patent application No. 61/700,759, titled, "METHOD AND APPARATUS FOR SELECTIVE BETTER SYSTEM RESELECTION FOR WIRELESS DEVICES CAPABLE OF CELL RESELECTION" and filed in the United States Patent and Trademark Office on Sep. 13, 2012, the entire content of which is incorporated herein by reference.

TECHNICAL FIELD

Aspects of the present disclosure relate generally to wireless communication systems, and more particularly, to method and apparatus for selective better system reselection for wireless devices capable of cell reselection.

BACKGROUND

Wireless communications systems are widely deployed to provide various types of communication content such as voice, video, packet data, messaging, broadcast, and so on. These systems may be accessed by wireless devices of multiple users sharing the available system resources (e.g., time, frequency, and power). Examples of such wireless communications systems include Code-Division Multiple Access (CDMA) systems, Time-Division Multiple Access (TDMA) systems, Frequency-Division Multiple Access (FDMA) systems, 3rd Generation Partnership Project (3GPP) Long Term Evolution (LTE) systems, and Orthogonal Frequency-Division Multiple Access (OFDMA) systems. These wireless communication systems generally use different radio access technologies and communication protocols, operate at different frequency bands, provide different quality of service (QoS) and offer different types of services and applications to the system users.

Due to the differences between these systems, wireless devices that were previously designed to operate on one system would not be capable of operating on another. To address this, wireless devices referred to as multimode devices were introduced and rapidly grew in popularity. Multimode devices are capable of operating on multiple heterogeneous wireless communication systems. Multimode devices are generally programmed to search for all available communication systems and connect to the most-preferred one, as specified by the operator or user preference.

Known system reselection techniques have limitations. For example, if the reselection period is too large, the wireless device would spend a longer time camped on the current less-preferred system. This could be detrimental to operator requirements. On the other hand, if reselection is done too often, the device will use a significant amount of time and power in scanning for other systems, which would adversely affect the battery life.

Furthermore, the duration of the scan may also cause problems. During reselection scanning, the wireless device's radio is tuned to frequencies other than the current channel. This means the device spends time not monitoring the paging channel on the current system, which may result in missed pages. Thus, having a long scan may be a disadvantage. In contrast, if the duration is too small, and if the reselection scan list is long enough not to fit in a single reselection instance, the device may never find the better system located at the end of the scan list.

Therefore, it would be desirable to have better reselection approaches.

SUMMARY

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

Aspects of the present disclosure are directed to methods and apparatus for selective better system reselection for wireless devices capable of cell reselection. An apparatus for wireless communication is configured to receive a message from a current system, the message including a neighbor list having one or more neighbor systems. The apparatus compares the neighbor list to a local preferred systems list, and determines the existence of a preferred neighbor system in the local preferred systems list. Here, a preferred neighbor system has higher priority than that of the neighbor systems in the neighbor list. The apparatus determines whether to perform Better System Reselect (BSR) for the preferred neighbor system instead of a cell reselection based on the determination.

In one aspect, the disclosure provides a method for wireless communication. The method includes: receiving a message from a current system, the message including a neighbor list including one or more neighbor systems; comparing the neighbor list to a local preferred systems list; determining an existence of a preferred neighbor system in the local preferred systems list, the preferred neighbor system having higher priority than that of the neighbor systems in the neighbor list; and determining whether to perform Better System Reselect (BSR) for the preferred neighbor system instead of cell reselection based on the determination.

Another aspect of the disclosure provides an apparatus for wireless communication. The apparatus includes: means for receiving a message from a current system, the message including a neighbor list including one or more neighbor systems; means for comparing the neighbor list to a local preferred systems list; means for determining an existence of a preferred neighbor system in the local preferred systems list, the preferred neighbor system having higher priority than that of the neighbor systems in the neighbor list; and means for determining whether to perform Better System Reselect (BSR) for the preferred neighbor system instead of cell reselection based on the determination.

Another aspect of the disclosure provides a computer program product including: a computer-readable storage medium including code for: receiving a message from a current system, the message including a neighbor list including one or more neighbor systems; comparing the neighbor list to a local preferred systems list; determining an existence of a preferred neighbor system in the local preferred systems list, the preferred neighbor system having higher priority than that of the neighbor systems in the neighbor list; and determining whether to perform Better System Reselect (BSR) for the preferred neighbor system instead of cell reselection based on the determination.

Another aspect of the disclosure provides an apparatus for wireless communication. The apparatus includes: a memory; and at least one processor coupled to the memory. The at least one processor is configured to: receive a message from a current system, the message including a neighbor list including one or more neighbor systems; compare the neighbor list to a local preferred systems list; determining an existence of a preferred neighbor system in the local preferred systems list, the preferred neighbor system having higher priority than that of the neighbor systems in the neighbor list; and determine whether to perform Better System Reselect (BSR) for the preferred neighbor system instead of cell reselection based on the determination.

These and other aspects of the invention will become more fully understood upon a review of the detailed description, which follows.

BRIEF DESCRIPTION OF THE DRAWINGS

These and other sample aspects of the disclosure will be described in the detailed description that follow, and in the accompanying drawings, wherein:

FIG. 7 is a diagram comparing the selective BSR invocation approach of the wireless device of FIG. 3 based on whether there is LTE coverage.

Figure 1:
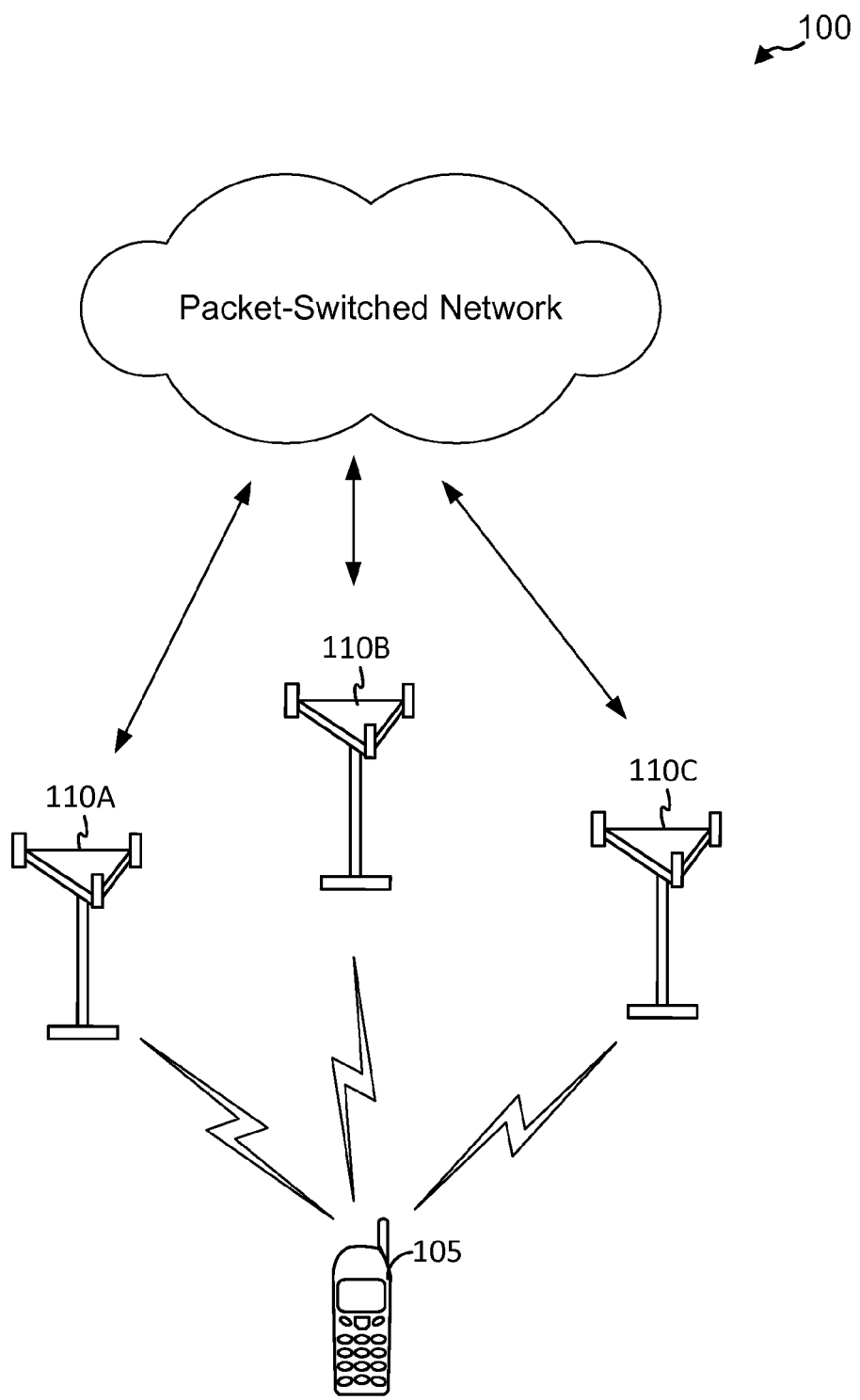
FIG. 1 is a block diagram illustrating a wireless device and a plurality of communications systems in which various aspects of a selectively invoking BSR approach may be implemented.

In accordance with common practice, some of the drawings may be simplified for clarity. Thus, the drawings may not depict all of the components of a given apparatus (e.g., device) or method. Finally, like reference numerals may be used to denote like features throughout the specification and figures.

DETAILED DESCRIPTION

In the following description, reference is made to the accompanying drawings in which is shown, by way of illustration, specific approaches in which the disclosure may be practiced. The approaches are intended to describe aspects of the disclosure in sufficient detail to enable those skilled in the art to practice the invention. Other approaches may be utilized and changes may be made to the disclosed approaches without departing from the scope of the disclosure. The following detailed description is not to be taken in a limiting sense, and the scope of the disclosure is defined only by the appended claims and their equivalents.

Elements described herein may include multiple instances of the same element. These elements may be generically indicated by a numerical designator (e.g., "110") and specifically indicated by the numerical indicator followed by an alphabetic designator (e.g., "110A") or a numeric indicator proceeded by a "dash" (e.g., "110-1"). For ease of following the description, for the most part element number indicators begin with the number of the drawing on which the elements are introduced or most fully discussed.

The following description provides examples, and is not limiting of the scope, applicability, or configuration set forth in the claims. Changes may be made in the function and arrangement of elements discussed without departing from the spirit and scope of the disclosure. Various aspects may omit, substitute, or add various procedures or components as appropriate. For instance, the methods described may be performed in an order different from that described, and various steps may be added, omitted, or combined. Also, features described with respect to certain aspects may be combined in other aspects.

The discussions herein may involve CDMA and Evolution-Data Optimized (EV-DO) protocols and systems as one example in order to indicate additional details of some aspects of the disclosed approaches. Another example is a complementary device enhancement known as simultaneous (1x) Voice and (EV-DO) Data implemented in a standard known as CDMA2000 (C2K) that enables CDMA2000-capable devices to access EV-DO packet data services while in an active 1x circuit-switch voice call. EV-DO may also be referred to as High Rate Packet Data (HRPD), or High Data Rate (HDR). As a further example, LTE systems also provide data services, and LTE-capable devices that may also make use of data services provided by the LTE system should attempt to do so because of the higher supported data rates. Enhanced High Rate Packet Data (eHRPD) is an enhancement of 1xEV-DO that enables LTE to CDMA handover However, those of ordinary skill in the art will recognize that various aspects of the disclosed approach may be used and included in many other wireless communication protocols and systems for service reselection. In particular, approaches for improving reselection performance to reduce power consumption, faster system acquisition time, and avoid reselection conflicts when applicable, are described herein.

In C2K, a wireless device may be in any of four states: mobile station initialization, mobile station idle, system access, and mobile station control on the traffic channel. While in the initialization state, the wireless device selects and acquires a system. After the wireless device acquires the system, it enters the idle state where the wireless device monitors messages on the forward common signaling channel (f-csch). The wireless device stays in the idle state until it receives a message (on the f-csch) or originates a call or performs registration on the reverse common signaling channel (r-csch). In the idle state (e.g., IDLE MODE), a wireless device has camped on a system, but it does not have any call activity, neither voice call or data call. If there is a call activity, the wireless device will not perform Better System Reselection (BSR) or cell-reselection because it will interrupt the continuity of ongoing service at the wireless device.

There are two methods a wireless device may use to move from C2K to LTE in idle state. The first method, referred to herein as Better System Reselection (BSR), is based on an approach known as Multi-Mode System Selection (MMSS). MMSS enables a wireless device to prioritize its preference for selecting particular radio air-interfaces across multiple standards. With MMSS, the wireless device may select and hence acquire C2K and non-C2K networks (e.g., LTE) based on a carrier's preferences. Generally, in BSR, system operators provision wireless devices with a list of systems ordered by preference. The wireless device may use this information to reselect to the most-preferred available system, while remaining camped on the currently acquired system. In BSR, although the wireless device has the list of preferred systems provisioned by the system operator, it should scan this preferred list to find out whether the preferred systems are available. One reason is because the wireless device may not have information about what services and systems are present in its current environment. Thus, the wireless device may have to scan through all spectrums, with a time-out mechanism for determining when to move from scanning for one system to the next.

The second method, referred to herein as cell-reselection, is based on an LTE neighbor list sent by the C2K network to the wireless device. The LTE neighbor list provides information regarding all available services and the frequencies over which it may communicate, as designated by the network. It should be noted that the network may not send information for systems that may be available to the wireless device in the LTE neighbor list, in which case the wireless device may not discover this information on its own unless it performs BSR instead of cell-reselection. Using cell-reselection based on the LTE neighbor list, however, the wireless device will still have information regarding the network designated available services and frequencies without having to scan for systems that may be non-existent.

In one aspect of the disclosed approach, if the wireless device and the network support both BSR and cell-reselection, it may be preferable to use cell-reselection. Since BSR is performed regardless of any knowledge of the existence of the system being attempted to be acquired, if both BSR and cell-reselection are triggered, the wireless device may consume more power to scan for systems. Cell-reselection may provide more power efficiency because scans may be performed only in the areas where LTE is deployed, thereby avoiding unnecessary scans. Also, the wireless device may switch to LTE faster because it is not relying on a timer-based approach to go through each of the listed systems, for example, advancing from the most to least preferred only when a search timer has expired, such as that used by BSR. Further, cell-reselection may not suffer any "ping-ponging" effect that may be caused by the wireless device switching between eHRPD and LTE based on hysteresis being added to LTE-to-eHRPD & eHRPD-to-LTE cell reselection parameters. Hence, once it is determined that cell-reselection is supported, it may be preferable to avoid BSR-based movement between the C2K and LTE Radio Access Technologies (RATs) of the same operator.

However, the use of BSR may be preferred in addition to, or instead of, cell-reselection in certain situations. In another aspect of the disclosed approach, BSR is preferred if not all available systems are listed in the LTE neighbor list; but the wireless device has a preference in using one of the non-listed, available systems. The wireless device may then use BSR to scan for one of the non-listed, available systems stored by the wireless device in a priority list. For example, as discussed above, system selection in a wireless communication environment may be based on priority lists provisioned by the original system operator of the wireless devices, where each priority list includes the preferred order in which a wireless device is to attempt access to systems in a geographic area.

For MMSS, an MMSS System Priority List (MSPL) is used with respect to the underlying two or more system selection priority lists (e.g., 3GPP's Private Land Mobile Network (PLMN) system selection priority list and C2K's Preferred Roaming List (PRL)). The provisioning information is typically stored in the wireless device. For a particular example of a dual mode C2K and GSM wireless device, there are two possibilities: either two cards containing a Removable User Identity Module (R-UIM) and a Subscriber Identification Module (SIM), respectively; or one card containing only the SIM. In an exemplary use of a wireless device capable of both LTE and C2K, a next generation smart card known as a Universal Integrated Circuit Card (UICC) may be used. The UICC would contain a Universal Subscriber Identity Module (USIM) application (essentially an application of the SIM approach for LTE) and a CSIM application (in place of the R-UIM approach for C2K). Regardless of the specific type of card or application that is used to store the priority information local to the wireless device, referred to herein as a local systems priority list, the wireless device may prefer to use a system in the local systems list that is not listed in the LTE neighbor list, in which case the wireless device may use BSR, because cell-reselection may limit the wireless device to the systems contained in the neighbor LTE list.

FIG. 1 illustrates one aspect of a wireless communication environment 100 that includes one or more multimode wireless devices such as a wireless device 105 and a plurality of wireless communication systems 110 (e.g., 110A-110C). The wireless device 105 may be a cellular telephone, a cordless telephone, a Session Initiation Protocol (SIP) phone, a personal digital assistant (PDA), a handheld device having wireless connection capability, a laptop computer, or other processing device connected to a wireless modem. The wireless device 105 may be referred to as a subscriber unit, subscriber station, mobile station, mobile, mobile device, remote station, remote terminal, Access Terminal (AT), user terminal, terminal, wireless communication device, user agent, user device, or user equipment (UE). The wireless communication systems 110 provide the wireless device 105 with radio access to a wired core network, such as a packet-switched network 120 (e.g., Internet) or a circuit-switched network (e.g., public switched telephone network). The system 110 may generally include one or more radio base stations having multiple antenna groups and/or a transmitter/receiver chain that can in turn include a plurality of components associated with radio signal transmission and reception (e.g., processors, modulators, multiplexers, antennas, etc. (not shown)) to and from the wireless device 105.

The wireless communication systems 110 may include, but are not limited to, CDMA, TDMA, FDMA, OFDMA, SC-FDMA and other systems. The terms "system" and "network" are used interchangeably herein. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

In one aspect, a multimode wireless device such as the wireless device 105 may access multiple independent wireless communication systems 110. For example, 1xCDMA2000 and HDR systems have common specifications that specify reselection procedures from one technology to another. In particular, in a 1x/HDR system, the wireless device 105 performs periodic reselection on preferred systems specified in a PRL of the device pursuant to a timer specified in the device's non-volatile memory, which may also be based on a geo-spatial location (GEO) area. Also, after the end of a call, the wireless device 105 may perform periodic reselection to a better system based on another timer parameter. Likewise, UMTS systems such as GSM and WCDMA have common specifications in which a wireless device is required to perform a first periodic search attempt for more preferred UMTS networks after two minutes of registration, and every T minutes thereafter, where T is specified in the subscriber identity module (SIM) of the mobile device. Further still, the wireless device 105 may also communicate with LTE networks, which provide significantly improved data rates and services.

For multimode wireless devices that support independent wireless communication systems, apart from just having these wireless devices searching for preferred systems in the radio access technology on which the wireless devices are currently registered, there is a need to perform better system reselection to preferred systems of other supported technologies pursuant to the relative preference of systems between these different technologies. To that end, in one aspect of the disclosed approach, the wireless device 105 may be configured to generate a combined preferred roaming list (PRL) that identifies relative preferences among various wireless communication systems 110A, 110B and 100C having different technologies. In another aspect of the disclosed approach, the wireless device 105 may be programmed with the combined PRL via a serial interface, a Universal Serial Bus (USB) interface, or any other suitable interface during manufacturing or activation. In yet another aspect, the wireless device 105 may obtain the combined PRL via over-the-air signaling during device activation, or it may be stored in a RUIM/CSIM/UIM module by the operator and distributed to users in the form of RUIM/CSIM cards. In any case, the wireless device 105 may store the combined PRL in a non-volatile memory, so that the PRL is retained even when power to the wireless device 105 is turned off.

Figure 2:
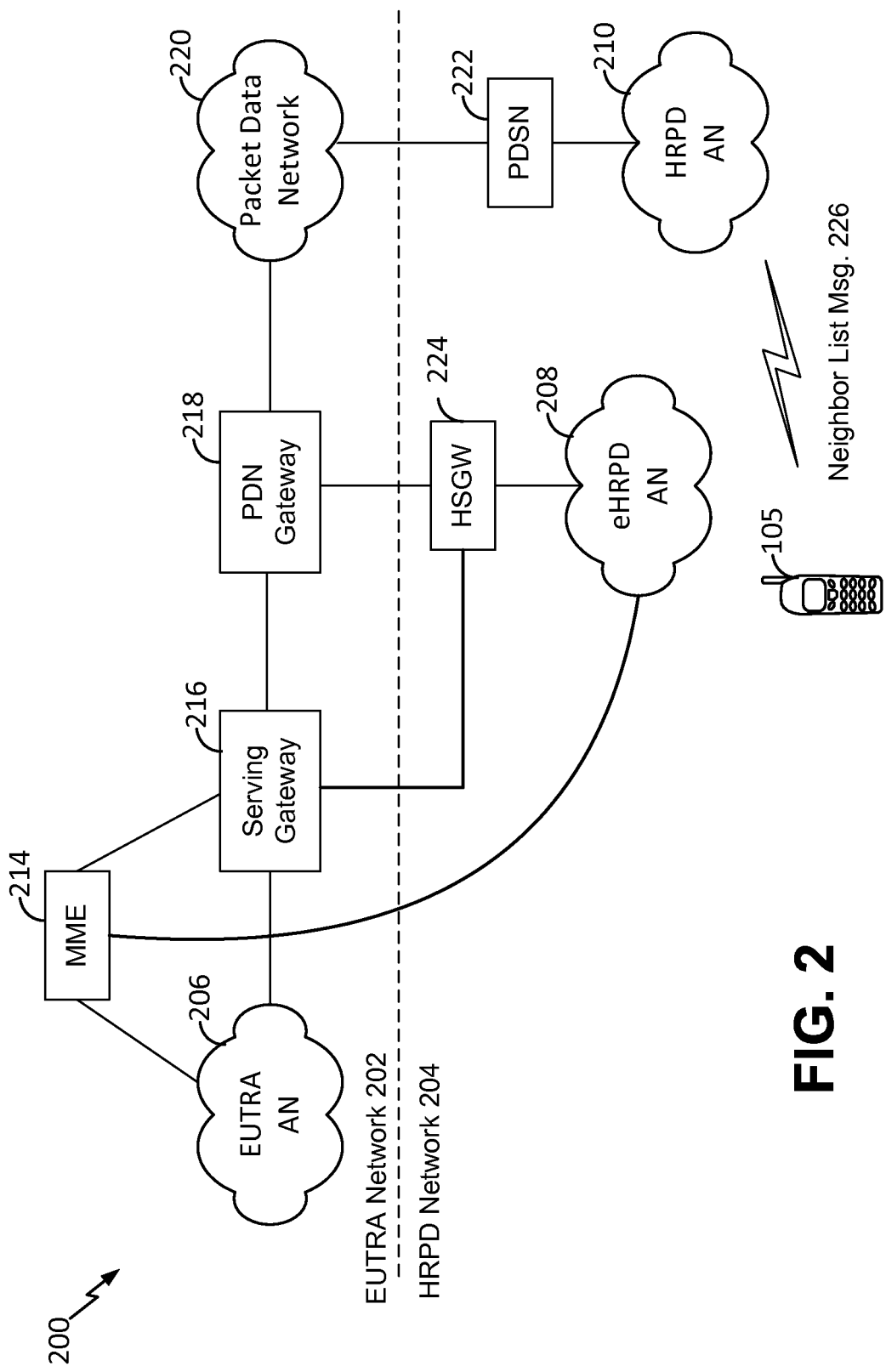
FIG. 2 is a conceptual block diagram illustrating a wireless device capable of being operated in an E-UTRA network and an HRPD network.

FIG. 2 is a conceptual block diagram 200 illustrating a wireless device 105 capable of being operated in an E-UTRA network 202 (e.g., LTE) and an HRPD network 204. HRPD is defined by the CDMA 2000 standards, as established by 3GPP2. In some implementations, the migration from HRPD to E-UTRA may be provided by evolved HRPD (eHRPD) technology. A wireless device 105 that supports the eHRPD technology can be handed off between the eHRPD access network and an E-UTRA access network. Additionally, a wireless device 105 that supports eHRPD can perform cell re-selection on either E-TURA or eHRPD access networks. In some aspects of the disclosure, a configuration message can be sent from an HRPD access network to the wireless device 105. One example of such configuration message is an Other RAT Neighbor List message which contains a list of neighboring cells with access technologies different from the access technology of the access network that the wireless device 105 is currently attached to.

Referring to FIG. 2, the E-UTRA network 202 includes an E-UTRA access network 206, and the HRPD network 204 includes an enhanced HRPD (eHRPD) access network 208 and a HRPD access network 210. The eHRPD RAN 204 allows for interworking between the HRPD network 204 and the E-UTRA network 202. The E-UTRA network 202 also includes a serving gateway 212 and a mobility management entity (MME) 214. The MME 214 is a control node for the E-UTRA access network 206. For example, the MME 214 is responsible for idle mode mobile station tracking and paging procedures.

The E-UTRA network 202 also includes a serving gateway 216 and a PDN gateway 218. The serving gateway 216 routes bearer data packets and acts as a mobility anchor for the user plane during handovers between different access networks. The packet data network (PDN) gateway 218 provides connectivity between the wireless device 105 and the packet data network 220 (e.g., Internet). The wireless device 105 may connect wirelessly with the HRPD access network 210 which is connected to the packet data network 220 via a packet data serving node (PDSN) 222. The eHRPD access network 208 allows for interworking between the HRPD network 204 and the E-UTRA network 202. The eHRPD access network 208 is connected to an HRPD serving gateway (HSGW) 224. The HSGW 224 provides interworking of the wireless device 105 with the EUTRA network 202. When the wireless device 105 is camped on the HRPD network 204, it may receive a neighbor list message 226 (e.g., Other RAT Neighbor List message) from the HRPD access network 210.

Figure 3:
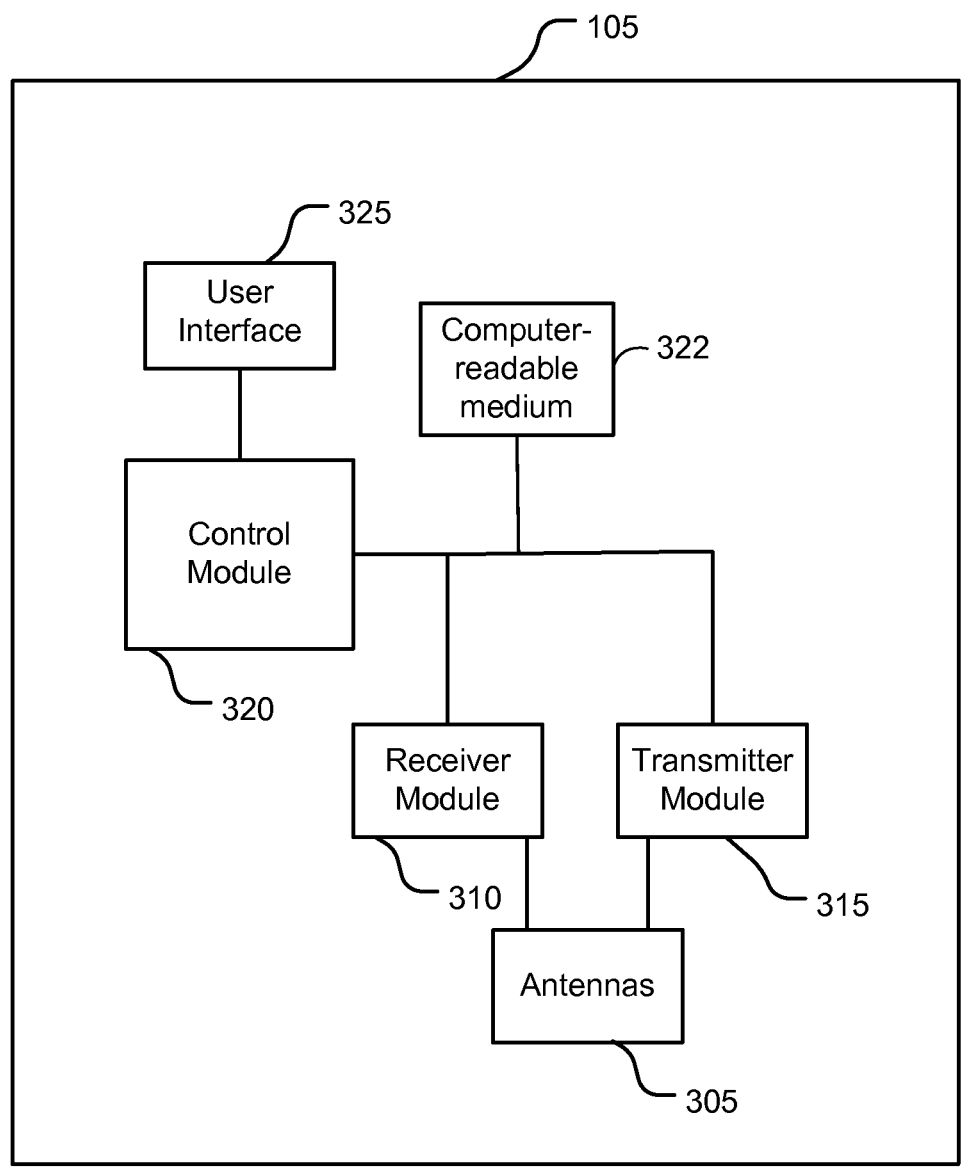
FIG. 3 is a block diagram of an exemplary wireless device configured in accordance with various aspects of the disclosed approach in which various aspects of the selective BSR invocation approach may be implemented.

FIG. 3 is a block diagram illustration of an exemplary wireless device 105. The wireless device 105 may have any number of different configurations, such as personal computers (e.g., laptop computers, netbook computers, tablet computers, etc.), cellular telephones, PDAs, digital video recorders (DVRs), Internet appliances, gaming consoles, e-readers, etc. The wireless device 105 may have a mobile configuration, having an internal power supply (not shown), such as a battery, to facilitate mobile operation. The wireless device 105 may include two or more antennas 305, which may be used in the transmission/reception of wireless communications between the wireless device 105 and one or more wireless networks (e.g., networks 202 and 204 in FIG. 2). In some aspects of the disclosure, the antennas 305 include a primary antenna and a secondary antenna, with the primary antenna used for transmission and reception of wireless communications on a first wireless communications channel (e.g., network 202), and the secondary antenna used for reception of wireless communications on a second wireless communications channel (e.g., network 204). In some devices, wireless communications can be received on more than two wireless communications channels, with such devices including additional antennas as necessary to receive wireless communications on three or more different wireless communications channels.

A receiver module 310 and a transmitter module 315 are coupled to the antennas 305. The receiver module 310 receives signals from the antennas, demodulates and processes the signals, and provides the processed signals to a control module 320. Similarly, the transmitter module 315 receives signals from the control module 320, processes and modulates the signals and transmits the processed and modulated signals using the antennas 305. In some aspects of the disclosure, the transmitter module 315 and receiver module 310 may be incorporated into a single transceiver module or multiple modules. The control module 320 performs processing tasks related to the operation of the wireless device 105, and is coupled to a user interface 325 that allows a user of the wireless device 105 to select various functions, control, and interact with the wireless device 105. The various components the wireless device 105 may be in communication with some or all of the other components of the wireless device 105 via one or more busses, for example. The wireless device 105 may also include a computer-readable medium 322 for storing data and information to be used for the various configurations and operations of the wireless device 105 disclosed herein.

Various aspects of the disclosed approach may be implemented with the components illustrated in FIGS. 1-2. Indeed, aspects of the disclosed approach may be implemented within and positioned within wireless communication devices such as those discussed above. Also, aspects of the disclosed approach may include circuits and components capable of carrying out the described algorithms in the flow charts described herein as well as the below discussed actions.

Figure 4:
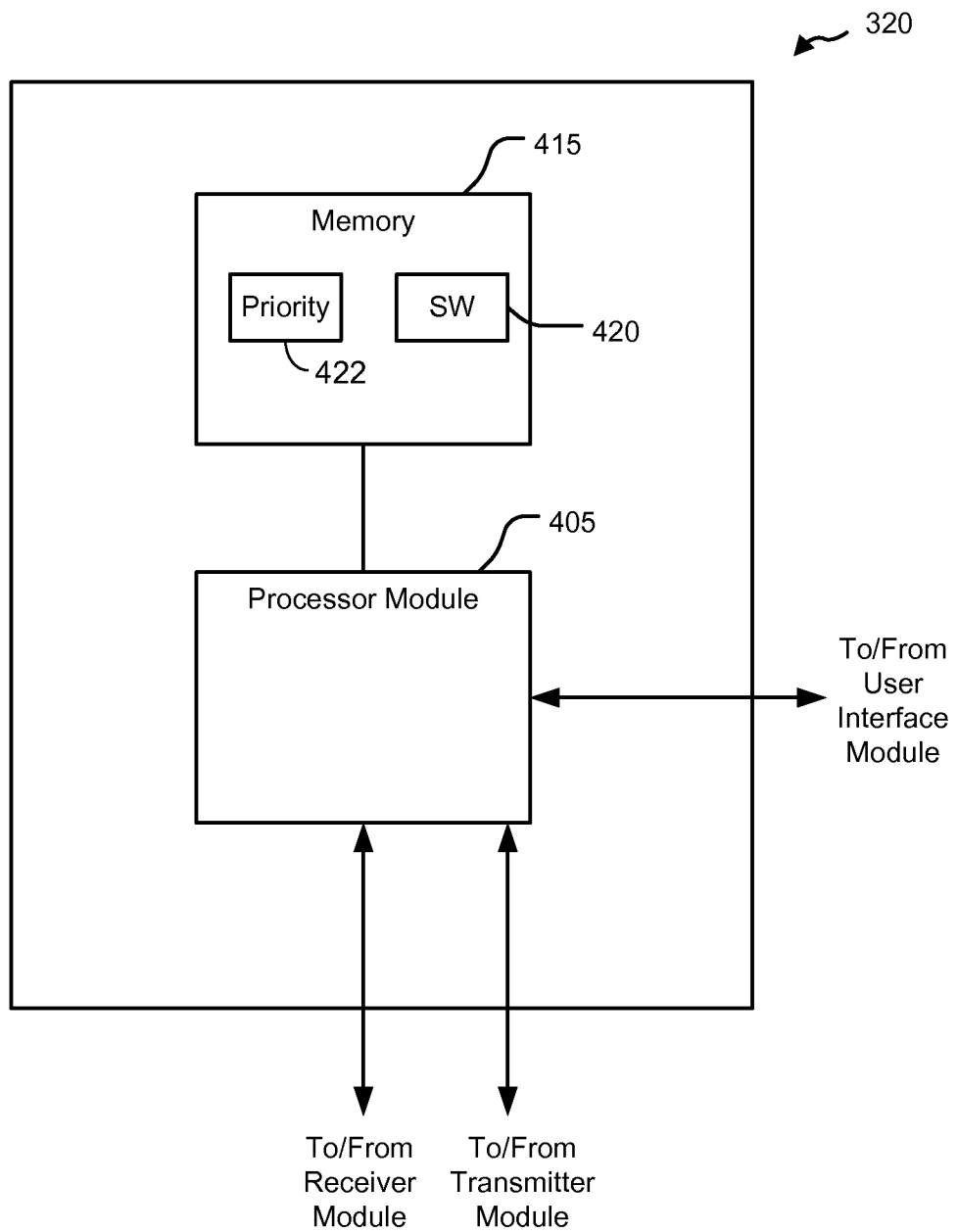
FIG. 4 is a block diagram of an exemplary control module of the wireless device of FIG. 3.

FIG. 4 illustrates a control module 320 of the wireless device 105 according to some aspects of the disclosure. The control module 320 includes a processor module 405. The control module 320 also may include a memory 415. As non-limiting examples, the memory 415 may include Random Access Memory (RAM), Read-Only Memory (ROM), Non-Volatile Random Access Memory (NVRAM), non-transitory storage such as Flash memory or combinations thereof. The memory 415 may store computer-readable, computer-executable software code 420 containing instructions that are configured to, when executed, cause the processor module 405 to perform various functions of the wireless device 200 (e.g., call processing, message routing, execution of applications, etc.). The memory 415 may store one or more priority lists (e.g., MSPL, PLMN, or PRL) that define a system selection preference among available networks during the operation of the wireless device 105. Alternatively, the software code 420 may not be directly executable by the processor module 405 but may be configured to cause the processor module 405 (e.g., when compiled and executed) to perform functions described herein, such as the processes shown in FIG. 7 described below. The software code 420 may also, when executed, cause the processor module 320 to track and record historical usage data relating to, for example, the communications characteristics of the packets received and transmitted by the wireless device 105. The historical communications data may be stored in memory 415 and accessed and updated as needed by the processor module 405.

The processor module 405 may include an intelligent hardware device, e.g., a central processing unit (CPU), a microcontroller, an application specific integrated circuit (ASIC), etc. The processor module 405 may include a speech encoder (not shown) configured to receive audio via a microphone, convert the audio into packets representative of the received audio, provide the audio packets to the transmitter module 315, and provide indications of whether a user is speaking. The processor module 405 may execute one or more applications that a user may access, through the user interface 325, to generate digital content that is to be transmitted from the wireless device 105. Such digital content may include email or text message communications, to name but two examples, that the processor module 405 may convert into data packets, and provide the data packets to the transmitter module 315.

When a multimode wireless device is operated in a multi-RAT environment such as those illustrated in FIGS. 1 and 2, the wireless device may perform cell reselection (e.g., C2K to LTE) based on a list of preferred systems to select the preferred neighbor system to camp. In order to implement the reselection process, one potential solution includes using provisioning based on the capability of a wireless device such as the wireless device 105. In this approach, an operator may be able to differentiate between wireless devices that may support cell-reselection from C2K to LTE from those that do not. In the wireless devices that support cell-reselection, the operator may provision MMSS tables to specify the priority because the operator's C2K network is the same as the operator's LTE network. However, issues related to this approach include complexity in provisioning, and the fact that the operator may still have to use a greater LTE-to-C2K priority in roaming situations because the operator has no control over when roaming partners may support LTE neighbor list.

In one aspect of the disclosed approach, by way of example, a wireless device-based (or UE based) solution is utilized, where all wireless devices may be provisioned with the same MSPL, in which LTE is preferred over C2K, but the wireless devices that support cell-reselection may ignore this priority ordering. As discussed above, there may be situations where BSR is preferred. For example, a priority rule stored on the wireless device 105 may be:

LTE(*Op*1)>LTE(*Op*2)>1x/DO(*Op*2), where Op1 and Op2 are operator 1 and operator 2, respectively, and LTE and 1x/DO are LTE and C2K (e.g., 1xEV-DO) networks, respectively.

Figure 5:
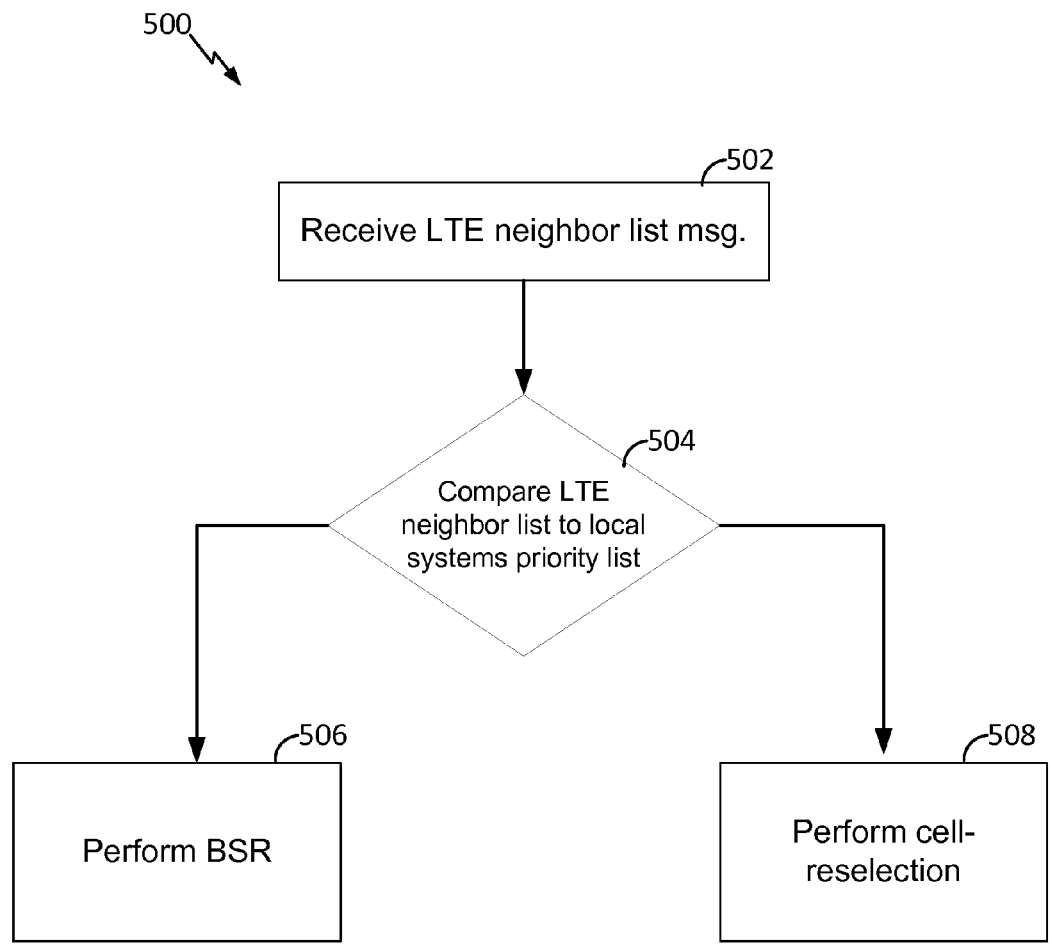
FIG. 5 is a block diagram illustrating a scheme in which a wireless device moves from C2K to LTE according to an aspect of the disclosure.

FIG. 5 is a block diagram 500 illustrating a selective BSR scheme in which a wireless device moves from C2K to LTE according to an aspect of the disclosure. Suppose, in block 502, the wireless device 105 receives a message (e.g., a neighbor list such as an LTE neighbor list) from a current system (e.g., C2K). In block 504, the LTE neighbor list is compared to a local systems priority list (e.g., a local preferred systems list). If it is determined that the LTE neighbor list includes LTE(Op2) but does not list LTE(Op1), when the wireless device 105 is camped on 1x/DO(Op2), the wireless device 105 may be configured to perform BSR for LTE(Op1) but not for LTE(Op2). In some aspects, the comparison between the local systems priority list and the LTE neighbor list includes comparing LTE frequencies of the local systems priority list and those of the LTE neighbor list. Thus, in this case, the wireless device 105 may compare the LTE neighbor list to the local systems priority list and, if it is determined that a preferred neighbor system (e.g., LTE(Op1)) in the local systems priority list is not in the LTE neighbor list, then the wireless device 105 may attempt to acquire the preferred neighbor system using BSR in block 506. Otherwise, in block 508, the wireless device 105 may perform cell-reselection for LTE (Op2) if LTE(Op2) is more preferred (i.e., higher priority) than LTE(Op1), or LTE(Op1) is listed in the LTE neighbor list. In one example, the LTE neighbor list may be an Other RAT neighbor list message.

Figure 6:
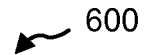
FIG. 6 is a drawing illustrating an enhancement of an Other RAT neighbor list message to support the selective BSR invocation approach.

FIG. 6 illustrates a modification 600 for an Other RAT neighbor list message to specify a list of public land mobile network (PLMN)-identifiers (IDs) referred to as Serving PLMN-IDs (S_PLMNID). The Other RAT neighbor list message contains a list of neighboring cells with access technologies different from the access technology of the access network that the wireless device 105 is currently attached to or camped on. This list may be used by the operators to specify PLMNs that are equivalent to the HRPD network transmitting the neighbor list. The fields that may be added to the end of the current neighbor list as specified in the E-UTRAN neighbor records format in 3GPP2 are shown in FIG. 6.

In one aspect for selectively invoking BSR, the 1x/HRPD network 204 may broadcast an LTE neighbor list 226 in all areas, including those without LTE coverage. The list should include the operator's LTE PLMN-ID(s) in the Serving PLMN-IDs list field. In areas where there is no LTE coverage, an operator should set the NumEUTRAFrequencies field to 0 in the LTE neighbor list message 226.

When a wireless device that supports reselection receives this neighbor list, it may only perform BSR for systems that are more preferred than both: 1) the current 1x/DO system; and 2) all the systems in the Serving PLMN-IDs list. Thus, an operator may provision the same MSPL in all wireless devices, but the wireless devices capable of utilizing reselection as disclosed herein may avoid BSR. These wireless devices may use reselection to transfer to LTE in areas with LTE coverage.

In one aspect of the disclosed approach, the ability to handle both legacy Other RAT Neighbor List messages (hereafter OtherRAT) and modified format Other RAT Neighbor List messages are supported in call processing. If the format of the OtherRAT message as modified herein is not supported in an initial release, a wireless device such as the wireless device 105 may still be able to handle receiving the modified format OtherRAT message. In one aspect of the disclosed approach, this may be similar to designing forward compatibility for any other EV-DO message, where the length field is examined and skipping to the end of the record when fields are encountered that are not understood. In another aspect of the disclosed approach, the modified format of the OtherRAT message is supported in an initial release, but the wireless device 105 may still be able to handle non-modified format of OtherRAT message.

In another aspect of the disclosed approach, a S_PLMNID list, which may be obtained in the OtherRAT message, may be provided to the call management (CM) and system determination (SD) subsystems (e.g., control module 320) of the wireless device 105. In one aspect of the disclosed approach, the CM subsystem provides commands processing between the user interface layer and protocols. For example, the CM subsystem may be responsible for receiving a command, and then processing and dispatching the command correctly. The CM subsystem may handle command related to calls, serving systems, phone preferences, and operating modes (e.g., ON, OFF, AIRPLANE, RESET, etc.). The SD subsystem decides how the wireless device should perform service acquisitions in different scenarios such as out of service, BSR, call, emergency, power-save, etc., as well as in different configurations based on user inputs, such as band, mode preferences, or PRL, etc. The S_PLMNID list should be updated when it changes, and a NULL list may be provided when the OtherRAT message or S_PLMNID list is absent. Further, cell-reselection should not be performed if the field NumEUTRAFrequencies=0, which indicates that there are no LTE networks present for re-selection.

In one aspect of the disclosed approach, a wireless device 105 is camped on a 1x/EV-DO system (e.g., HRPD network 204). Here, requirements on CM/SD restrict the BSR list based on the S_PLMNID list from EV-DO Call Processing (CP). Thus, the CM/SD may perform BSR only for those systems that are more preferred than both: 1) the current 1x/EV-DO system; and 2) all the systems in the S_PLMNID list.

If a PLMN-ID that is present in the S_PLMNID list is acquired while performing BSR, then the CM/SD may not camp on it because BSR does not provide hysteresis. It should be noted that BSR may be performed in the LTE (Op1)>LTE (Op2)>1x/DO (Op2) scenario. In general, if there is no EV-DO service present, then BSR should be used.

In one example, a wireless device 105 camps on 1x/DO (Op2) and performs BSR to LTE (Op1), which has a PLMN-ID that does not belong to a neighbor list. However, if the wireless device 105 ends up on the LTE (Op2), the wireless device will not camp on it because LTE (Op2) belongs to the neighbor list and it can be reselected through the cell-reselection method.

FIG. 7 illustrates a comparison 700 of the operation of a wireless device such as the wireless device 105 depending on whether an LTE network is available. If the LTE network is available, the C2K cells completely contained in this area may advertise the LTE Neighbor list message with: 1) Serving PLMN-IDs contains Operator's LTE PLMN-ID; and 2) LTE neighbor frequencies. Wireless devices that do not implement the selective BSR approach may still execute BSR for LTE based on MSPL. However, for wireless devices that implement the selective BSR approach, such as the wireless device 105, no BSR may be executed for the operator's LTE network, but may execute reselection evaluation for LTE neighbors.

In contrast, for areas where there is no LTE coverage, in one aspect C2K cells that lie in this area advertise LTE neighbor list message with: 1) Operator's LTE PLMN-ID and 2) No LTE frequencies (e.g., LTE neighbor frequencies=0). In this event, wireless devices that do not implement the selective BSR approach may still execute BSR for LTE based on MSPL. However, for wireless devices that implement the selective BSR approach, such as the wireless device 105, no BSR or cell-reselection may be performed because there are no neighbors.

Figure 8:
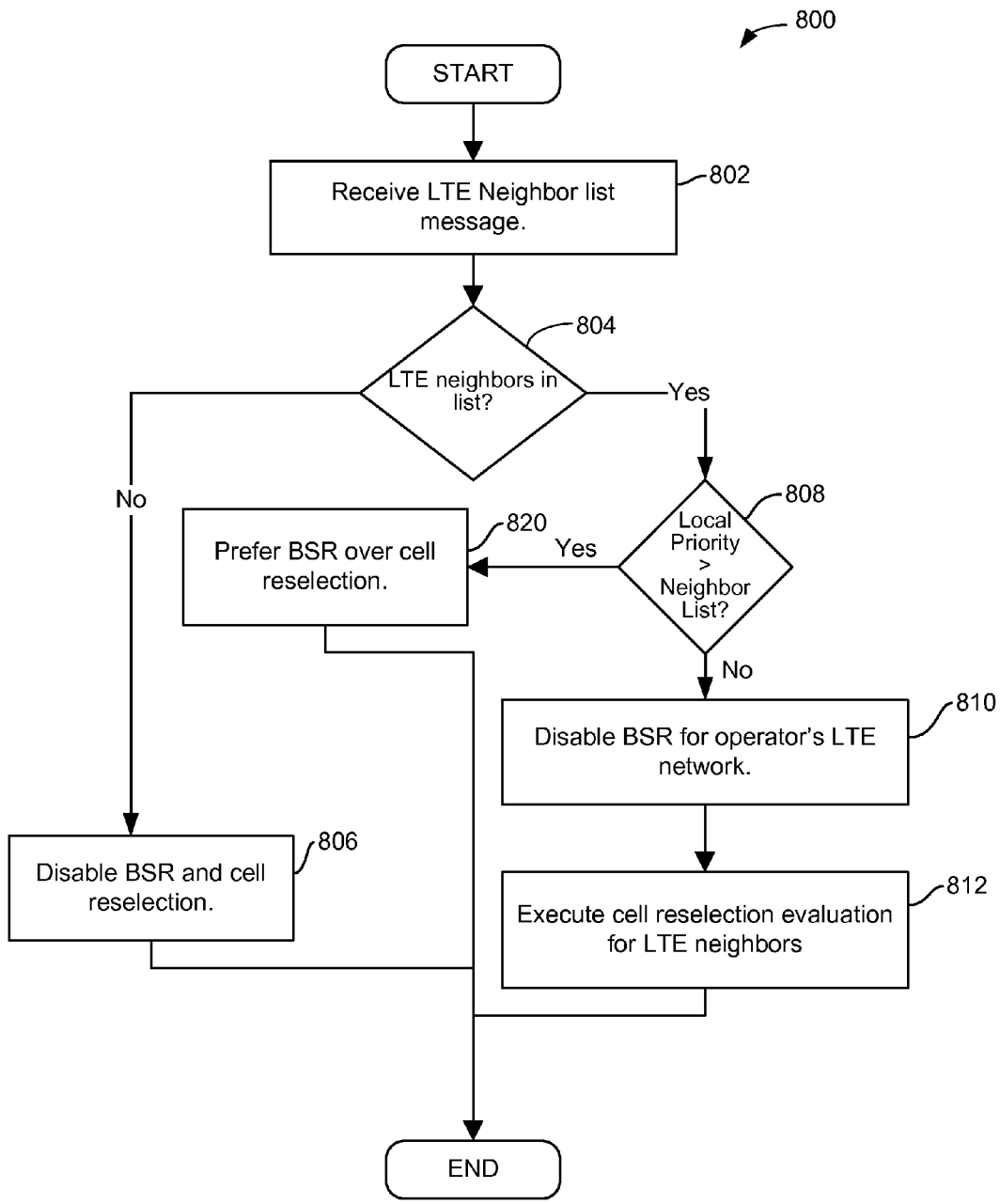
FIG. 8 is a flow diagram of an exemplary process for a selective BSR invocation approach of the wireless device of FIG. 3.

FIG. 8 illustrates a selective BSR invocation process 800 that may be implemented by a wireless device such as the wireless device 105, where at 802, the wireless device 105 receives a message (e.g., an LTE neighbor list message) from a current system such as a C2K cell (e.g., 210 of FIG. 2). In one aspect of the disclosed approach, the contents of the LTE neighbor list message as broadcasted by the C2K cell may be different depending on if the C2K cell is completely contained in an area covered by an LTE network (e.g., 202). In one aspect of the disclosed approach, if the C2K cell is completely in an LTE coverage area, the LTE neighbor list message may contain: 1) Serving PLMN-IDs containing Operator's LTE PLMN-ID, and 2) LTE neighbor frequencies. Otherwise, the LTE neighbor list message may contain: 1) the Operator's LTE PLMN-ID, and 2) no LTE frequencies.

At 804, the wireless device 105 determines if there are LTE neighbor systems based on the LTE neighbor list message received from the C2K cell. If no LTE neighbor system exists, operation may continue at 806. Otherwise, if the wireless device 105 determines there are one or more LTE neighbor systems, then operation continues at 808. In an aspect of the disclosed approach, the wireless device 105 may determine if LTE neighbor systems exist by determining if the LTE neighbor list message contains a list of LTE neighbor frequencies.

At 806, if it is determined that no LTE neighbor system exists, then the wireless device 105 may disable both BSR and cell reselection processes for LTE because there is no LTE neighbor system for which to search.

At 808, it is determined if a local preferred systems list, as stored on the wireless device 105, contains a preferred neighbor system with which the wireless device 105 may communicate, but that is not listed in the LTE neighbors list message. That is, the preferred neighbor system may have priority over the systems contained in the LTE neighbors list. In one aspect of the disclosed approach, the preferred neighbor system may include a preferred frequency, cell, carrier, RAT, or any other parameters specified by a home operator. As discussed above, the home operator may specify these parameters during the provisioning of the wireless device 105. If there is a preferred neighbor system with which the wireless device 105 prefers to connect but is not listed in the LTE neighbor list message, then operation may continue at 820. Otherwise, operation continues at 810.

At 820, where it is determined the preferred neighbor system is not listed in the LTE neighbors list, then the wireless device 105 may invoke BSR to acquire the preferred system. In one aspect, the wireless device 105 may only perform BSR for systems that are more preferred than both: 1) the current system (e.g., C2K system); and 2) all the systems (e.g., LTE neighbor systems) in the Serving PLMN-IDs list.

At 810, if it is determined that at least one LTE neighbor system exists in the LTE neighbor list message, then the wireless device 105 may disable BSR for the operator's network. Operation may then continue at 812.

At 812, the wireless device 105 may perform a cell reselection evaluation for LTE neighbor systems based on the information contained in the LTE neighbors list messages transmitted by the C2K system and received by the wireless device 105 at 802.

The control module 302 described herein, or any part of the wireless device 105, may provide the means for performing the functions recited herein. Alternatively, the code on the computer-readable medium 322 and or the memory 415 may provide the means for performing the functions recited herein.

One or more of the components, acts, features and/or functions described herein and illustrated in the drawings may be rearranged and/or combined into a single component, act, feature, or function or embodied in several components, acts, features, or functions. Additional elements, components, acts, and/or functions may also be added without departing from the invention. The algorithms described herein may also be efficiently implemented in software and/or embedded in hardware.

In the description, elements, circuits, and functions may be shown in block diagram form in order not to obscure the disclosed approach in unnecessary detail. Conversely, specific implementations shown and described are exemplary only and should not be construed as the only way to implement the disclosed approach unless specified otherwise herein. Additionally, block definitions and partitioning of logic between various blocks is exemplary of a specific implementation. It is readily apparent to one of ordinary skill in the art that the disclosed approach may be practiced by numerous other partitioning solutions. For the most part, details concerning timing considerations and the like have been omitted where such details are not necessary to obtain a complete understanding of the disclosed approach and are within the abilities of persons of ordinary skill in the relevant art.

Also, it is noted that the aspects may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Those of ordinary skill in the art would understand that information and signals may be represented using any of a variety of different technologies and techniques. For example, data, instructions, commands, information, signals, bits, symbols, and chips that may be referenced throughout this description may be represented by voltages, currents, electromagnetic waves, magnetic fields or particles, optical fields or particles, or any combination thereof. Some drawings may illustrate signals as a single signal for clarity of presentation and description. It will be understood by a person of ordinary skill in the art that the signal may represent a bus of signals, wherein the bus may have a variety of bit widths and the disclosed approach may be implemented on any number of data signals, including a single data signal.

It should be understood that any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed there or that the first element must precede the second element in some manner. In addition, unless stated otherwise, a set of elements may include one or more elements.

Moreover, a storage medium may represent one or more devices for storing data, including read-only memory (ROM), random access memory (RAM), magnetic disk storage mediums, optical storage mediums, flash memory devices and/or other machine-readable mediums and, processor-readable mediums, and/or computer-readable mediums for storing information. The terms "machine-readable medium," "computer-readable medium," and/or "processor-readable medium" may include, but are not limited to non-transitory mediums such as portable or fixed storage devices, optical storage devices, and various other mediums capable of storing, containing or carrying instruction(s) and/or data. Thus, the various methods described herein may be fully or partially implemented by instructions and/or data that may be stored in a "machine-readable medium," "computer-readable medium," and/or "processor-readable medium" and executed by one or more processors, machines and/or devices.

Furthermore, aspects may be implemented by hardware, software, firmware, middleware, microcode, or any combination thereof. When implemented in software, firmware, middleware or microcode, the program code or code segments to perform the necessary tasks may be stored in a machine-readable medium such as a storage medium or other storage(s). A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The various illustrative logical blocks, modules, circuits, elements, and/or components described in connection with the examples disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing components, e.g., a combination of a DSP and a microprocessor, a number of microprocessors, one or more microprocessors in conjunction with a DSP core, or any other such configuration. A general-purpose processor, configured for executing aspects described herein, is considered a special purpose processor for carrying out such aspects. Similarly, a general-purpose computer is considered a special purpose computer when configured for carrying out aspects described herein.

The methods or algorithms described in connection with the examples disclosed herein may be embodied directly in hardware, in a software module executable by a processor, or in a combination of both, in the form of processing unit, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

Those of skill in the art would further appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware, software, or a combination thereof depends upon the particular application and design selections imposed on the overall system.

The various features of the invention described herein can be implemented in different systems without departing from the invention. It should be noted that the foregoing aspects are merely examples and are not to be construed as limiting the invention. The description of the aspects is intended to be illustrative, and not to limit the scope of the claims. As such, the present teachings can be readily applied to other types of apparatuses and many alternatives, modifications, and variations will be apparent to those skilled in the art.

The previous description is provided to enable any person skilled in the art to fully understand the full scope of the disclosure. Modifications to the various configurations disclosed herein will be readily apparent to those skilled in the art. Thus, the claims are not intended to be limited to the various aspects of the disclosure described herein, but is to be accorded the full scope consistent with the language of claims, wherein reference to an element in the singular is not intended to mean "one and only one" unless specifically so stated, but rather "one or more." Unless specifically stated otherwise, the term "some" refers to one or more. A claim that recites at least one of a combination of elements (e.g., "at least one of A, B, or C") refers to one or more of the recited elements (e.g., A, or B, or C, or any combination thereof). All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method for wireless communication comprising:
   receiving a message from a current system, the message comprising a neighbor list comprising one or more neighbor systems;
   comparing the neighbor list to a local preferred systems list;
   determining an existence of a preferred neighbor system in the local preferred systems list, the preferred neighbor system having higher priority than that of the neighbor systems in the neighbor list;
   determining whether to perform Better System Reselect (BSR) for the preferred neighbor system instead of cell reselection based on the determination; and
   if the preferred neighbor system exists in the local preferred systems list and is not listed in the neighbor list, performing a reselection using BSR for the preferred neighbor system.

2. The method of claim 1, wherein the preferred neighbor system has a priority greater than those of both the current system and the neighbor systems in the neighbor list.

3. The method of claim 1, wherein the local preferred systems list comprises a Multi-Mode System Selection (MMSS) priority list.

4. The method of claim 1, wherein the local preferred systems list comprises a list provisioned by a home operator.

5. The method of claim 1, wherein the preferred neighbor system is an LTE system, and the current system is a cdma2000 based system.

6. The method of claim 1, wherein the comparing the neighbor list to the local preferred systems list comprises:
   comparing at least one LTE frequency of the neighbor list to that of the local preferred systems list; and
   determining whether the neighbor list comprises at least one LTE neighbor system.

7. The method of claim 6, wherein the determining whether the neighbor list comprises at least one LTE neighbor system comprises:
   determining whether the message indicates a number of neighbor LTE frequencies that is greater than zero.

8. The method of claim 6, further comprising:
   disabling both cell reselection and BSR based on a determination that no LTE neighbor system exists in the neighbor list.

9. The method of claim 6, further comprising:
   if the neighbor list comprises at least one LTE neighbor system, performing cell reselection for the at least one LTE neighbor system instead of performing BSR for the preferred neighbor system.

10. An apparatus for wireless communication comprising:
    means for receiving a message from a current system, the message comprising a neighbor list comprising one or more neighbor systems;
    means for comparing the neighbor list to a local preferred systems list;
    means for determining an existence of a preferred neighbor system in the local preferred systems list, the preferred neighbor system having higher priority than that of the neighbor systems in the neighbor list;

means for determining whether to perform Better System Reselect (BSR) for the preferred neighbor system instead of cell reselection based on the determination; and if the preferred neighbor system exists in the local preferred systems list and is not listed in the neighbor list, means for performing a reselection using BSR for the preferred neighbor system.

11. The apparatus of claim 10, wherein the preferred neighbor system has a priority greater than those of both the current system and the neighbor systems in the neighbor list.

12. The apparatus of claim 10, wherein the local preferred systems list comprises a Multi-Mode System Selection (MMSS) priority list.

13. The apparatus of claim 10, wherein the local preferred systems list comprises a list provisioned by a home operator.

14. The apparatus of claim 10, wherein the preferred neighbor system is an LTE system, and the current system is a cdma2000 based system.

15. The apparatus of claim 10, wherein the means for comparing the neighbor list to the local preferred systems list comprises:
means for comparing at least one LTE frequency of the neighbor list to that of the local preferred systems list; and
means for determining whether the neighbor list comprises at least one LTE neighbor system.

16. The apparatus of claim 15, wherein the means for determining whether the neighbor list comprises at least one LTE neighbor system comprises:
determining whether the message indicates a number of neighbor LTE frequencies that is greater than zero.

17. The apparatus of claim 15, further comprising:
means for disabling both cell reselection and BSR based on a determination that no LTE neighbor system exists in the neighbor list.

18. The apparatus of claim 15, further comprising:
if the neighbor list comprises at least one LTE neighbor system, means for performing cell reselection for the at least one LTE neighbor system instead of performing BSR for the preferred neighbor system.

19. A computer program product, comprising:
a non-transitory computer-readable storage medium comprising code for:
receiving a message from a current system, the message comprising a neighbor list comprising one or more neighbor systems;
comparing the neighbor list to a local preferred systems list;
determining an existence of a preferred neighbor system in the local preferred systems list, the preferred neighbor system having higher priority than that of the neighbor systems in the neighbor list;
determining whether to perform Better System Reselect (BSR) for the preferred neighbor system instead of cell reselection based on the determination; and
if the preferred neighbor system exists in the local preferred systems list and is not listed in the neighbor list, performing a reselection using BSR for the preferred neighbor system.

20. The computer program product of claim 19, wherein the preferred neighbor system has a priority greater than those of both the current system and the neighbor systems in the neighbor list.

21. The computer program product of claim 19, wherein the local preferred systems list comprises a Multi-Mode System Selection (MMSS) priority list.

22. The computer program product of claim 19, wherein the local preferred systems list comprises a list provisioned by a home operator.

23. The computer program product of claim 19, wherein the preferred neighbor system is an LTE system, and the current system is a cdma2000 based system.

24. The computer program product of claim 19, wherein the code for comparing the neighbor list to the local preferred systems list comprises code for:
comparing at least one LTE frequency of the neighbor list to that of the local preferred systems list; and
determining whether the neighbor list comprises at least one LTE neighbor system.

25. The computer program product of claim 24, wherein the code for determining whether the neighbor list comprises at least one LTE neighbor system comprises code for:
determining whether the message indicates a number of neighbor LTE frequencies that is greater than zero.

26. The computer program product of claim 24, wherein the computer-readable storage medium further comprising code for:
disabling both cell reselection and BSR based on a determination that no LTE neighbor system exists in the neighbor list.

27. The computer program product of claim 24, wherein the computer-readable storage medium further comprising code for:
if the neighbor list comprises at least one LTE neighbor system, performing cell reselection for the at least one LTE neighbor system instead of performing BSR for the preferred neighbor system.

28. An apparatus for wireless communication, comprising:
a memory; and
at least one processor coupled to the memory,
wherein the at least one processor is configured to:
receive a message from a current system, the message comprising a neighbor list comprising one or more neighbor systems;
compare the neighbor list to a local preferred systems list;
determining an existence of a preferred neighbor system in the local preferred systems list, the preferred neighbor system having higher priority than that of the neighbor systems in the neighbor list;
determine whether to perform Better System Reselect (BSR) for the preferred neighbor system instead of cell reselection based on the determination; and
if the preferred neighbor system exists in the local preferred systems list and is not listed in the neighbor list, perform a reselection using BSR for the preferred neighbor system.

29. The apparatus of claim 28, wherein the preferred neighbor system has priority greater than those of both the current system and the neighbor systems in the neighbor list.

30. The apparatus of claim 28, wherein the local preferred systems list comprises a Multi-Mode System Selection (MMSS) priority list.

31. The apparatus of claim 28, wherein the local preferred systems list comprises a list provisioned by a home operator.

32. The apparatus of claim 28, wherein the preferred neighbor system is an LTE system, and the current system is a cdma2000 based system.

33. The apparatus of claim 28, wherein the at least one processor being configured to compare the neighbor list to the local preferred systems list, is further configured to:
compare at least one LTE frequency of the neighbor list to that of the local preferred systems list; and determining whether the neighbor list comprises at least one LTE neighbor system.

34. The apparatus of claim 33, wherein the at least one processor being configured to determine whether the neighbor list comprises at least one LTE neighbor system, is further configured to:
determine whether the message indicates a number of neighbor LTE frequencies that is greater than zero.

35. The apparatus of claim 33, wherein the at least one processor is further configured to:
disable both cell reselection and BSR based on a determination that no LTE neighbor system exists in the neighbor list.

36. The apparatus of claim 33, wherein the at least one processor is further configured to:
if the neighbor list comprises at least one LTE neighbor system, perform cell reselection for the at least one LTE neighbor system instead of performing BSR for the preferred neighbor system.

* * * * *